US 6,501,243 B1

(12) United States Patent
Kaneko et al.

(10) Patent No.: US 6,501,243 B1
(45) Date of Patent: Dec. 31, 2002

(54) SYNCHRONOUS MOTOR-CONTROL APPARATUS AND VEHICLE USING THE CONTROL APPARATUS

(75) Inventors: Satoru Kaneko, Urizura-machi (JP); Ryoso Masaki, Hitachi (JP); Yasuo Morooka, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 29 days.

(21) Appl. No.: 09/652,653

(22) Filed: Aug. 31, 2000

(30) Foreign Application Priority Data

Feb. 28, 2000 (JP) ........................................ 2000-056046

(51) Int. Cl.⁷ ............................................... H02P 3/18
(52) U.S. Cl. ..................... 318/700; 318/138; 318/139; 318/254; 318/432; 318/434; 318/439; 318/700; 318/701; 318/721; 318/722; 318/800; 318/807
(58) Field of Search ................................ 318/138, 254, 318/439, 700, 701, 721, 722, 800, 807, 139, 432, 434

(56) References Cited

FOREIGN PATENT DOCUMENTS

| AT | 402 773 B | 8/1993 | |
| JP | 7-245981 | 9/1995 | ............. H02P/6/16 |
| JP | 08066082 | 3/1996 | |
| JP | 08205578 | 8/1996 | |
| JP | 8-205578 | 8/1996 | ............. H02P/6/16 |
| WO | 95/34125 | 12/1995 | |

OTHER PUBLICATIONS

*An Approach to Real–Time Position Estimation at Zero and Low Speed for a PM Motor Based on Saliency*, Satoshi Ogasaware and Hirofumi Akagi, 1996 IEEE (pp. 29–35).

*A Novel Position Sensor Elimination Technique for The Interior Permanent–Magnet Synchronous Motor Drive*, Ashok B. Kulkarni et al 1989, IEEE (pp. 773–779).

*Primary Examiner*—Marlon T. Fletcher
*Assistant Examiner*—Tyrone Smith
(74) *Attorney, Agent, or Firm*—Crowell & Moring LLP

(57) ABSTRACT

A digital calculation apparatus 4 including a position-detection means 14 for detecting the magnetic pole position, based on the detected current difference values of the synchronous motor 1 in a two-phase short-circuit state, takes in current flowing in the synchronous motor by generating an interruption trigger signal in synchronization with the PWM signals for driving an inverter 3, and driving an A/D converter with the generated trigger signal.

8 Claims, 8 Drawing Sheets

FROM CALCULATION APPARATUS 4

SYNCHRONOUS MOTOR-CONTROL APPARATUS AND VEHICLE USING THE CONTROL APPARATUS

BACKGROUND OF THE INVENTION

The present invention relates to a motor-control apparatus which controls a synchronous motor (including a reluctance motor) and a vehicle using the motor-control apparatus, and especially to a motor-control apparatus suitable for an electrical car or a hybrid car.

Since information on the magnetic pole position of the rotor is necessary to control the rotational speed or the torque of a synchronous motor, the magnetic pole position is generally detected with a position-detection sensor such as an encoder, a resolver, etc. However, a position-detection sensor is expensive, and has a problem in that a short-circuit may occur in it under some using-environmental conditions. Therefore, magnetic pole position-detection methods in which a position-detection sensor is not used has been devised or developed.

For example, Japanese Patent Application Laid-Open Hei 8-205578 and Japanese Patent Application Laid-Open Hei 7-245981 disclose conventional magnetic-pole-detection techniques for a synchronous motor. Japanese Patent Application Laid-Open Hei 8-205578 discloses a method of detecting the saliency in a synchronous motor based on the correlation of the vector of voltage applied to the synchronous motor by means of a PWM control, and ripple components in motor current caused by the applied voltage. On the other hand, Japanese Patent Application Laid-Open Hei 7-245981 discloses a method of detecting the magnetic pole position of a synchronous motor by detecting parallel and orthogonal components in a current vector or a voltage vector, corresponding to an alternating voltage vector or an alternating current vector, applied to the synchronous motor with salient poles, calculating a phase difference angle between the flux axis and the applied vector based on at least one of the detected components, and determining the magnetic pole position based on the calculated phase difference angle.

The former method has an advantage that since ordinary PWM signals for controlling the voltage applied to the synchronous motor are used, an additional signal to detect the magnetic pole position is not necessary. And, the latter method has an advantage that since the magnetic pole position is detected by applying an alternating voltage or an alternating current to the synchronous motor, it is possible to detect the magnetic pole position, also during the stopping of the motor, in which the induced voltage useful for detecting the magnetic pole position is not available, or during the very low speed operation of the motor.

To implement the above former conventional technique, it is necessary to detect the motor current and voltage at every time the respective PWM signals change. That is, the motor current and voltage must be detected at least six times during one cycle of the carrier wave for PWM, and the correlation is calculated at each time of the detection, which in turn causes a problem in that a high-performance controller is needed. And, in the above latter conventional technique, it is necessary to apply the alternating voltage or current to the synchronous motor in order to detect the magnetic pole position, and this causes a problem in that the level of torque vibrations or noises increases in a high-load operation state.

SUMMARY OF THE INVENTION

An objective of the present invention is to provide a motor-control apparatus, in which any additional signal for detecting a magnetic pole position of a rotor in a motor is not necessary, and which is capable of detecting the magnetic pole positions without using a position-detection sensor while performing an ordinary PWM control, and which uses a low-priced digital calculation apparatus such as a microcomputer; and a vehicle using the motor-control apparatus.

The above objective is achieved by providing a synchronous motor-control apparatus including a synchronous motor, a PWM inverter for driving the synchronous motor, and a digital calculation apparatus for controlling the PWM inverter, the synchronous motor-control apparatus comprising: magnetic pole position-detection means, situated in the digital calculation apparatus, for obtaining the magnetic pole position based on current, which flows in the synchronous motor, input to the digital calculation apparatus; and control means for controlling the synchronous motor based on the detected magnetic pole position; wherein the magnetic pole position-detection means takes in the current, which flows in the synchronous motor, by operating an A/D converter with an interruption signal generated by the position-detection means in synchronization with PWM signals for driving the PWM inverter.

In the above magnetic pole position-detection means, it is necessary to determine a short-circuit state in the synchronous motor, and this short-circuit state is determined by examining whether the state of a PWM signal for each phase is in a high (Hi) state or a low (Low) state.

Further, if harmonic components of the rotation frequency of the synchronous motor are contained in the signals of the detected magnetic pole positions, it is desirable to locate a digital filter for removing the harmonic components at the output portion of the magnetic pole position-detection means, and to make its cut-off frequency changeable, corresponding to the rotation frequency of the synchronous motor.

DETAILED DESCRIPTION OF THE EMBODIMENTS

Hereafter, details of the embodiments according to the present invention will be explained with reference to the drawings.

Figure 9:
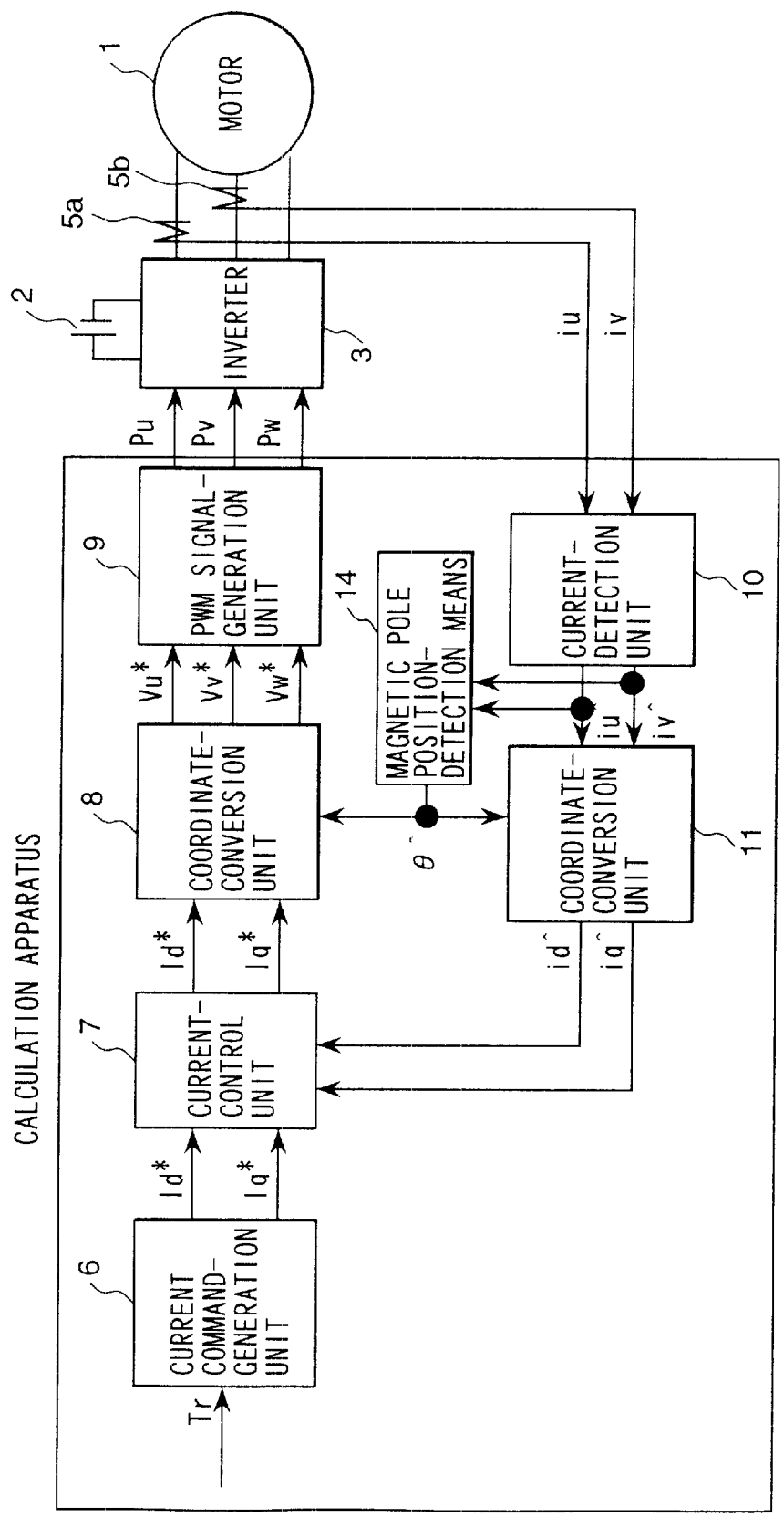
FIG. 9 is a schematic block diagram showing the composition of another position-sensorless motor-control system.

First, a schematic block diagram indicating an example of the composition of a synchronous motor-control apparatus without a magnetic pole position sensor (referred to as a position-sensorless synchronous motor-control apparatus), to which the present invention is applied, is shown in FIG. 9. Since the present invention relates to a magnetic pole-detection method which does not use a magnetic pole position sensor, a position-sensorless motor-control system in this embodiment is explained below. However, the present invention is not restricted to a position-sensorless synchronous motor-control system, and can also be applied to a motor-control system with a magnetic pole position sensor. Such a motor-control system with a magnetic pole position sensor, to which the present invention is applied, can be used for detecting an anomaly in the position sensor, and can also function as a back-up position sensor.

FIG. 9 shows a diagram showing the composition of a motor-control system in which a synchronous motor 1 is driven with direct current (referred to as DC) power fed from a battery 2. The DC voltage fed from the battery 2 is converted to the three-phase alternating current (referred to as AC) voltage by an inverter 3, and is applied to the synchronous motor 1. A command value for indicating the applied voltage, namely, a three-phase AC voltage command value, is calculated by a digital calculation apparatus 4. First, a current command-generation unit 6 determines a d-axis current command id* and a q-axis current command iq*, corresponding to a torque command value Tr which is demanded of the synchronous motor 1. Here, the d-axis indicates the magnetic pole direction in the rotor in the synchronous motor 1, and the q-axis indicate the direction perpendicular to the d-axis.

The motor-control system controls motor current in the d-q rotating coordinate system. Next, U-phase current iu and V-phase current iv, detected by respective current sensors 5a and 5b, are taken into the digital calculation apparatus 4 via a current-detection unit 10 consisting of an A/D converter and so on, and are converted to a detected d-axis current value id^ and a detected q-axis current value iq^, respectively.

In the system shown in FIG. 9, only the U and V-axis current values in the motor current are detected by the current-detection unit 10, and the W-phase current value is obtained using the detected U and V-axis current values. However, the present invention can be applied, without difficulty, to a motor-control system in which all the U, V, and W-axis current are detected. Further, a current-control unit 7 determines a d-axis voltage command Vd* and a q-axis voltage command Vq* such that the difference between the command value id* and the detected value id^ of the d-axis current, and the difference between the command value iq* and the detected value iq^ of the q-axis current, are zero. Furthermore, a coordinate-conversion unit 8 converts the d-axis voltage command Vd* and the q-axis voltage command Vq* to three-phase AC voltage commands Vu*, Vv*, and Vw*, and sends them to a PWM signal-generation unit 9. The PWM signal-generation unit 9 converts the three-phase AC voltage commands Vu*, Vv*, and Vw* to PWM signals, and sends them to the inverter 3. Consequently, the respective voltage corresponding to the three-phase AC voltage commands Vu*, Vv*, and Vw*, is applied to the motor 1. Here, the d-q rotating coordinate system rotates with a rotating angle θ which is a magnetic pole position in the α-β rest coordinate system. Therefore, the detection of the magnetic pole position θ in the rotor is necessary in the coordinate-conversion units 8 and 11. This detected magnetic pole position θ^ is obtained by a magnetic pole position-detection means 14.

The composition and operations, of the position-sensorless synchronous motor-control system and the calculation apparatus situated in this motor-control system, are such as those mentioned above. Although this motor-control system is explained as a torque-control system to which a torque command is input, it is possible to compose the motor-control system as a speed-control system in which a speed-control unit is added as an upper-level subsystem, and a speed command is input to the speed-control unit. In such a speed-control system, an estimated speed ω^ is obtained using the rate of change in the detected θ^, and this estimated speed ω^ is used as a speed feed-back value.

Figure 10:
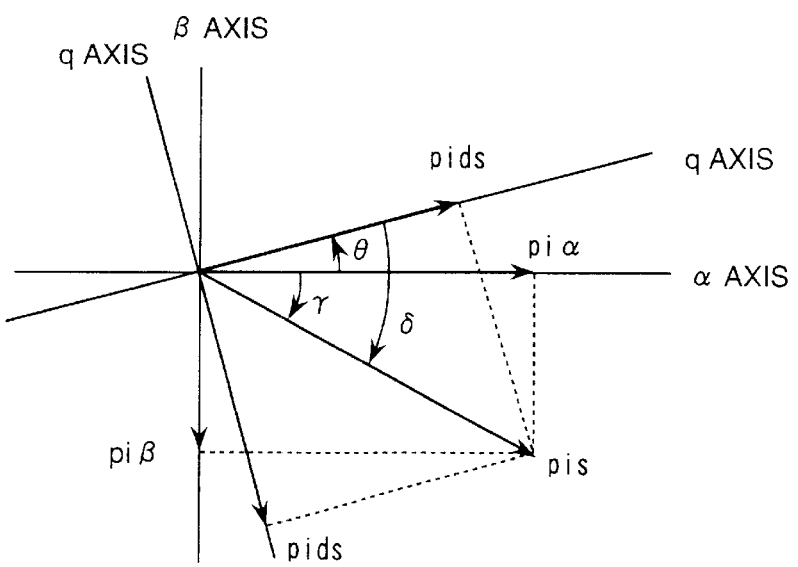
FIG. 10 is an illustration showing the relationship between the magnetic pole and the current difference vector in the three-phase short-circuit state of a synchronous motor.

The magnetic pole position-detection method used in the magnetic pole position-detection means 14 is not restricted to a specific method. One effective position-detection method is a method in which a current difference in a short-circuit state of a synchronous motor is detected, and the magnetic polar position is obtained, based on the quantity and the direction of the current difference. This method, in which "a current difference in a short-circuit state of a synchronous motor is detected, and the magnetic polar position is obtained, based on the quantity and the direction of the current difference", (hereafter referred to as a current difference type magnetic pole position-detection method), is briefly explained below. First the relationship between the magnetic pole position θ and the current difference vector pis in a three-phase short-circuit state of a synchronous motor, is shown in FIG. 10. As shown in FIG. 10, the magnetic pole position to be detected corresponds to the phase shift between the a-axis in the rest coordinate system and the d-axis in the rotating coordinate system, and is expressed by the equation (1).

$$\theta = \gamma - \delta \quad (1),$$

where γ is a phase of the current difference vector pis in a three-phase short-circuit state of a synchronous motor, from the α-axis, and δ is a phase of the current difference vector pis, from the d-axis. Therefore, in order to obtain the magnetic pole position θ, it is necessary to detect the phase γ and the phase δ. First, the phase δ is obtained by the equation (2).

$$\delta = \tan^{-1}(piqs/pids) = \tan^{-1}[-Ld\{\omega((Ld-Lq)id+\phi)+R\cdot iq\}/\{Lq\{\omega((Lq-Ld)id-R\cdot id)\}] \quad (2),$$

where Ld and Lq are the d-axis inductance and the q-axis inductance, respectively, R is the wound wire resistance, and ω is the motor angular speed. Here, the equation (2) is derived from the state equation of the motor in the three-phase short-circuit state. The motor angular speed in the equation (2) is obtained from the rate of change in the detected magnetic pole position, and if the resistance R component can be neglected, the influence of an error in ω can be neglected. The detected values id^ and iq^ can be used for the id and iq in the equation (2). Next, the phase is obtained by the equations (3), (4), and (5), using the detected current differences piu and piv in the three-phase short-circuit state of the synchronous motor.

$$piα=(\sqrt{3/2})·piu \quad (3)$$

$$piβ=(1/\sqrt{2})(piu+2piv) \quad (4)$$

$$γ=\tan^{-1}(piβ/piα) \quad (5)$$

Notice that, in the above calculation, the current differences piu and piv for two phases are used for obtaining piα and piβ. However, piα and piβ can be also obtained by using the current differences piu, piv, and piw, for three phases. Thus, the phases δ an γ are obtained, and the magnetic pole position is obtained by substituting the calculated δ and γ into the equation (1).

The outline of the current difference type magnetic pole position-detection method has been explained above. This method can be applied to not only a salient-pole type synchronous motor but also a cylinder type synchronous motor. As explained above, in order to implement the current difference type magnetic pole position-detection method, it is necessary to determine the short-circuit state of the motor, and detect motor current corresponding with the short-circuit state. Therefore, an actual implementing way of the current difference type magnetic pole position-detection method is described below.

Figure 11:
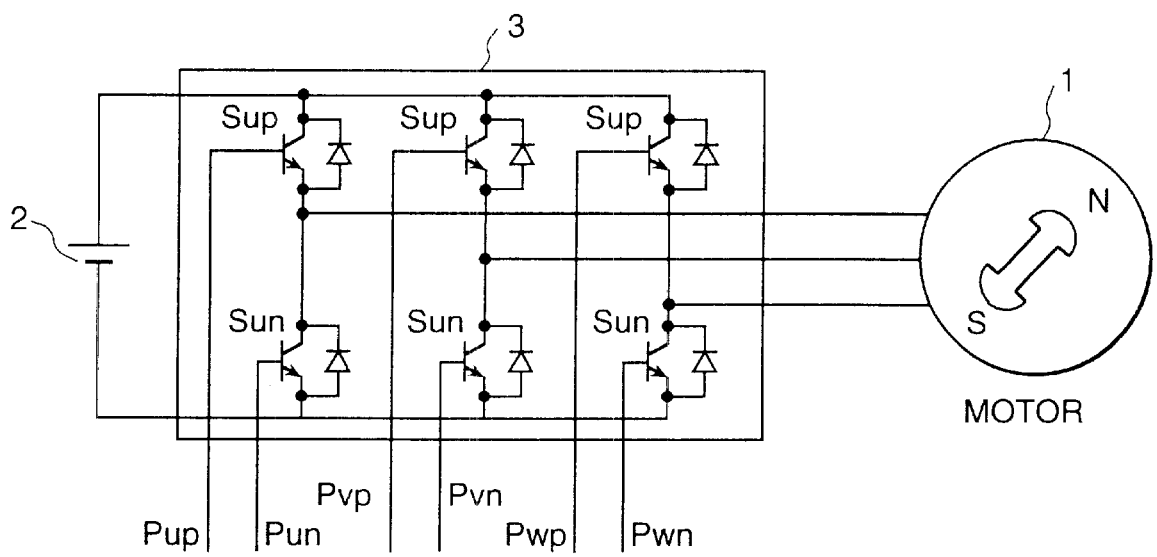
FIG. 11 is a diagram showing an example of the composition of an inverter.

First, the composition of the inverter 3 is shown in FIG. 11. The digital calculation apparatus 4 sends the PWM signals Pup, Pun, Pvp, Pvn, Pwp, and Pwn, (simply described as Pu, Pv, and Pw, in this figure), and controls switching elements Sup, Sun, Svp, Svn, Swp, and Swn, corresponding to the respective PWM signals. Here, Pup and Pun ((Pvp and Pvn), and (Pwp and Pwn)), are a Hi-level signal and a Low-level signal, respectively. Meanwhile, in order to prevent a short-circuit in the power source, when the polarity of each PWM pulse signal is reversed, a time interval for which the elements in both an upper arm and a lower arm are in the inactive state, that is, a dead time interval, is usually provided. Thus, since the digital calculation apparatus 4 converts the AC voltage commands (Vu*, Vv*, and Vw*) to the PWM signals, and the PWM inverter 3 further applies the voltage to the motor 1 in response to the PWM signals, the same voltage is applied to the phases of arms active at the same side. That is, if all the upper three arms or all the lower three arms are in the active state, since the same voltage is applied to the three phase of the upper arms or the lower arms, the motor 1 is in the three-phase short-circuit state. Here, since the PWM signals are generated in the digital calculation apparatus 4, it is possible to determine a short-circuit state of the motor 1 by examining the PWM signals generated in the digital calculation apparatus.

Figure 1:
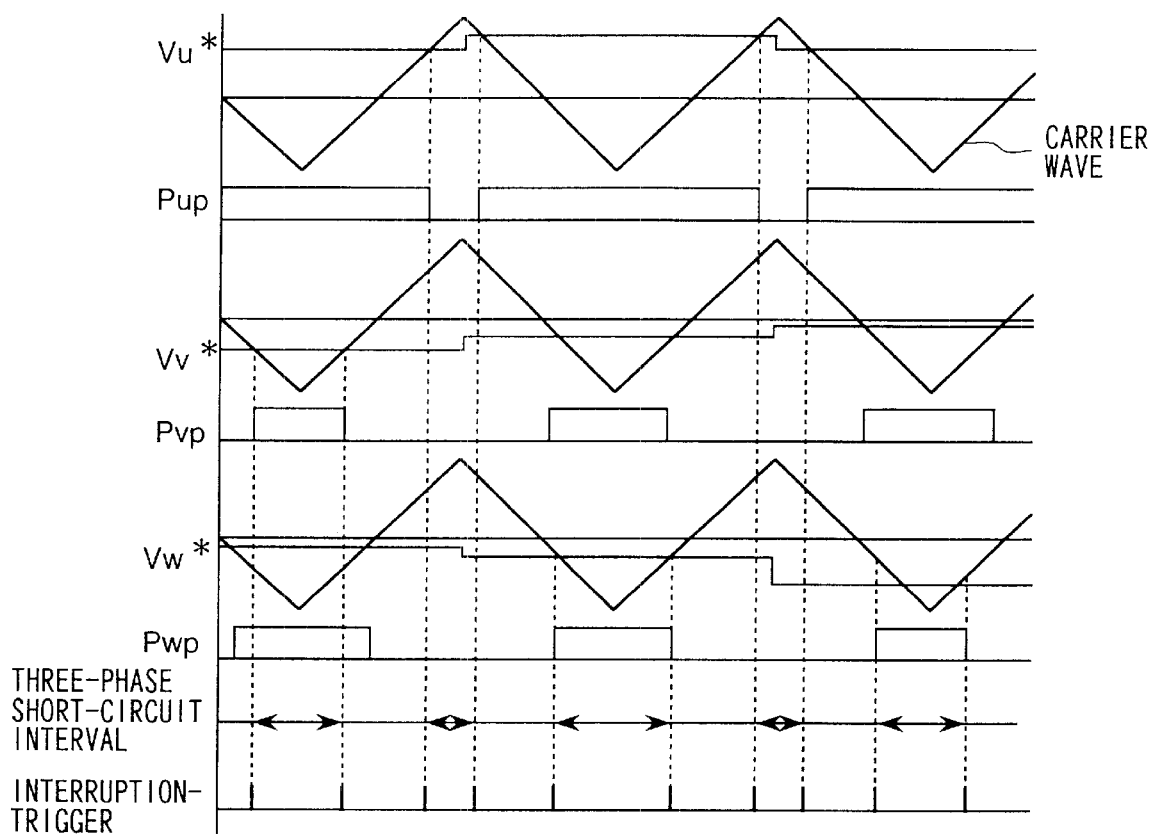
FIG. 1 is a graph showing changes in PWM signals in the case where the determination of a three-phase short-circuit state, and the current-detection in the three-phase short-circuit state, are executed.

Next, a three-phase short-circuit-determination method and a current difference-calculation method for the three-phase short-circuit state is explained below. Although this embodiment is explained assuming that the digital calculation apparatus 4 is a microcomputer, the digital calculation apparatus 4 is not restricted to being a microcomputer. FIG. 1 is a graph showing a concept of the three-phase short-circuit-determination, and changes in the PWM signals used for current detection in the three-phase short-circuit state. Here, FIG. 1 is a simplified graph showing only the PWM signals in the upper arms which is turned to the active state by a Hi-level signal.

As shown in FIG. 1, the levels of all the PWM signals are the same at each crest or each trough of the PWM carrier wave. That is, the levels of the PWM signals indicate a Hi-level at every crest of the PWM carrier wave, and the levels of the PWM signals conversely indicate a Low-level at every trough of the PWM carrier wave. This situation means that since the same voltage is applied to the three phases of the motor 1, the motor 1 is in the three-phase short-circuit state. In FIG. 1, each of the three-phase short-circuit intervals is shown by a pair of thick arrow. Here, in order to obtain each current difference in the three-phase short-circuit state, using the digital calculation apparatus 4, by detecting the motor current in synchronization with the rise and fall of the PWM signal with the narrowest width, the amount of current change, that is, the current difference in the interval corresponding to the narrowest width, is obtained. In other words, at the timing when the maximum or minimum value in the voltage command values for the three phases agrees with the value of the PWM carrier wave, an interruption-trigger T1 is generated. Consequently, the current-detection unit 10 is started by the interruption-trigger T1, and the motor current is detected.

In this way, by detecting the motor current in synchronization with the rise and the fall of the PWM signal with the narrowest width, the current differences can be obtained in the three-phase short-circuit state of the motor 1, which in turn makes it possible to implement the above current difference type magnetic pole position-detection method. In detecting the three-phase short-circuit state, the trigger T1 can be output in synchronization with the PWM signal corresponding to the phase receiving either the maximum voltage command value or the minimum voltage command value. If there is room in the computational capacity of the digital calculation apparatus 4, the motor current can be detected by outputting the trigger T1 in synchronization with the PWM signals corresponding to both phases which receive the maximum voltage command value and the minimum voltage command value. In this detection method, since the magnetic pole position can be obtained twice in one cycle of the PWM period, it becomes possible to detect the magnetic pole position more accurately. FIG. 1 shows the interruption trigger-generation manner in the case where the trigger T1 is generated in synchronization with the PWM signals corresponding to both the phases which receive the maximum voltage command value and the minimum voltage command value.

Figure 2:
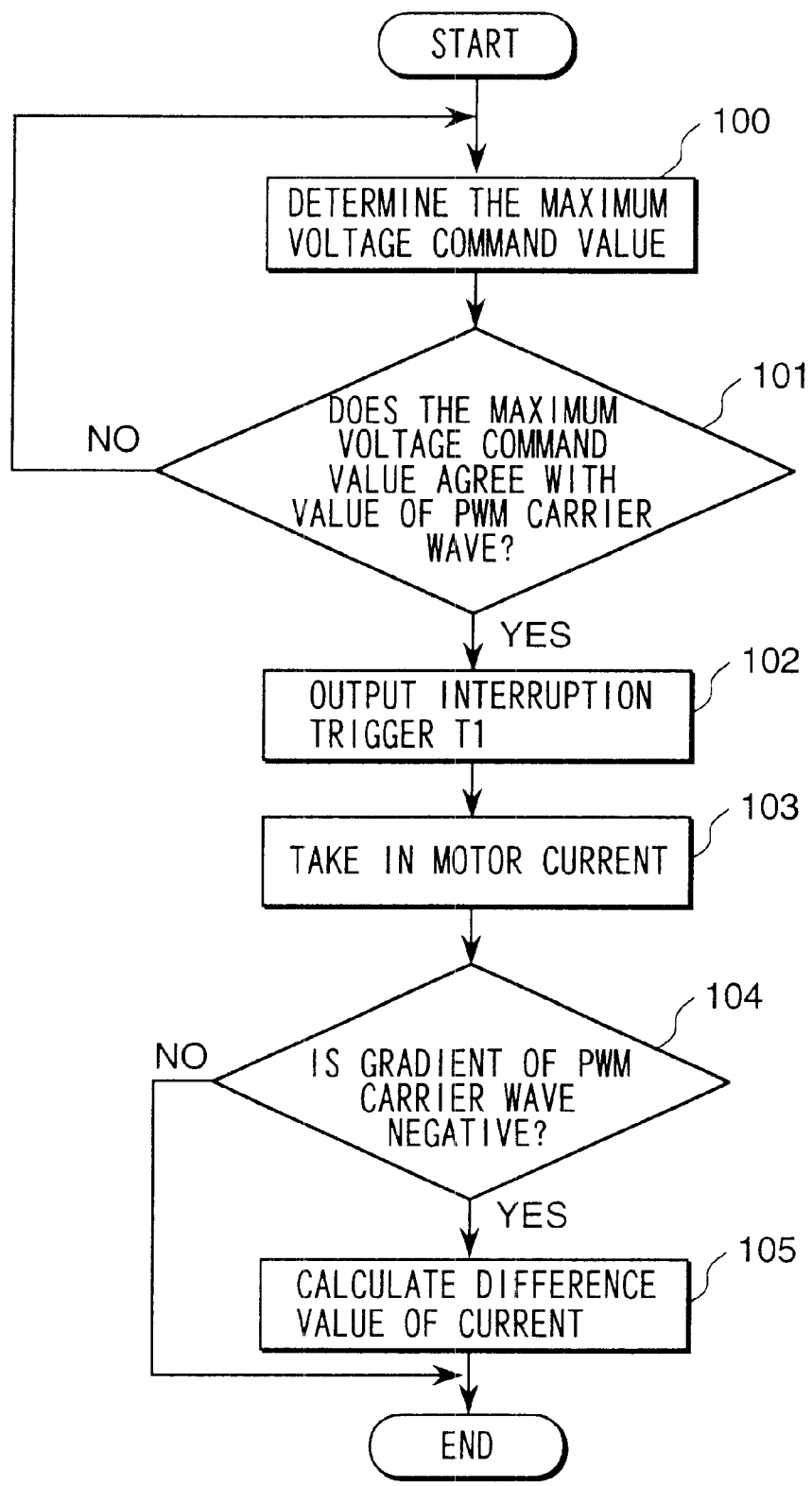
FIG. 2 is a flow chart of the processing of current differences-detection, in which the current difference values in the three-phase short-circuit state are obtained, based on the change in the PWM signal corresponding to the maximum voltage command value.

Further, the processes of detecting the current differences in the three-phase short-circuit state, executed by the digital calculation apparatus 4, is explained below with reference to the flow chart shown in FIG. 2. FIG. 2 shows the processes of detecting the current differences in the three-phase short-circuit state, based on the PWM signal corresponding to the phase receiving the maximum voltage command value. First, in step 100, the phase receiving the maximum voltage command value is determined in the three phases. In step 101, the time point at which the maximum voltage command value agrees with the PWM carrier wave is detected. That is, this time point is the rise point or the fall point of the PWM signal corresponding to the phase receiving the maximum voltage command value. If it is determined in step 101, that the maximum voltage command value agrees with the PWM carrier wave, the interruption trigger signal T1 is generated and output. Further, in step 103, the process of detecting the motor current is started in response to the trigger signal T1, and the motor current is input to the digital calculation apparatus 4.

Furthermore, in step 104, the gradient of the PWM carrier wave, at the time point when the maximum voltage command value agrees with the PWM carrier wave, is determined. If the gradient of the PWM carrier wave is positive, it is determined that this point is the start point of the three-phase short-circuit state, and only the process of inputting the motor current is executed. Conversely, if the gradient of the PWM carrier wave is negative, it is determined that this point is the end point of the three-phase short-circuit state, and after the motor current is input, the current differences are obtained using the current values detected at the start and end points of the three-phase short-circuit state, respectively. The above explanation is for the three-phase short-circuit-determination method and the current difference-calculation method used in this determination method.

Although the flow chart of determining the three-phase short-circuit state, based on the PWM signal corresponding to the phase receiving the maximum voltage command value, is shown in FIG. 2, the determining of the three-phase short-circuit state is possible based on the PWM signal corresponding to the phase receiving the maximum voltage command value, or the PWM signals corresponding to both phases which receive the maximum and minimum voltage command values. In addition, although a dead time interval is not considered in the flow chart shown in FIG. 2, if there is a dead time interval, it is necessary to generate the interruption signal T1 by taking the dead time interval into account. Further, although the execution timing of the magnetic pole position-calculation using the obtained current difference values is not restricted to a specific time point, it is desirable to finish this calculation before the next generation of the three-phase short-circuit begins.

In accordance with the above-explained processing, the current difference type magnetic pole position-detection method can be implemented by using the digital calculation apparatus 4.

In the following, the second embodiment according to the present invention will be explained. The magnetic pole position-detection method, which uses the current differences in the three-phase short-circuit state of the motor, used for the synchronous motor-control apparatus of the above first embodiment, has been explained above. However, since the time interval of the three-phase short-circuit state becomes very short, the current differences cannot be detected, depending on the performance of the calculation apparatus, and whether the magnetic pole position is well calculated or not. Under such conditions, it is useful to obtain the current differences in the interval in the two-phase short-circuit state, and estimate the current differences in the three-phase short-circuit state, using those current differences obtained in the two-phase short-circuit state. This is because, since two of the three phases are in the same voltage state in the two-phase short-circuit state, which always occurs in the PWM control of the motor, and this state continues longer than the three-phase short-circuit state, the current differences can be more reliably obtained in the two-phase short-circuit state than those in the three-phase short-circuit state. Hereafter, the method of estimating the current differences in the three-phase short-circuit state with the current differences obtained in the two-phase short-circuit state is referred to as a two-phase short-circuit method.

In the following, the outline of the two-phase short-circuit method will be explained. The conversion equations for converting the three-phase AC voltage Vu, Vv, and Vw to the two-phase AC voltage Vα and Vβ, are indicated by the equations (6) and (7).

$$V\alpha = \sqrt{2/3}\{Vu - (1/2)Vv - (1/2)Vw\} \qquad (6)$$

$$V\beta = \sqrt{2/3}\{(\sqrt{3/2})Vv - (\sqrt{3/2})Vw\} \qquad (7)$$

Here, it is known from the equations (6) and (7) that Vα is not zero, but Vβ is zero, in the two-phase short-circuit state in which the V and W phases have the same potential. Therefore, it is also known that since the current difference in the direction, in which the current difference does not receive an influence of Vα in the two-phase short-circuit state, does not receive an influence of the applied voltage, this current difference agrees with the current difference in the same direction as that of this current difference.

Figure 3:
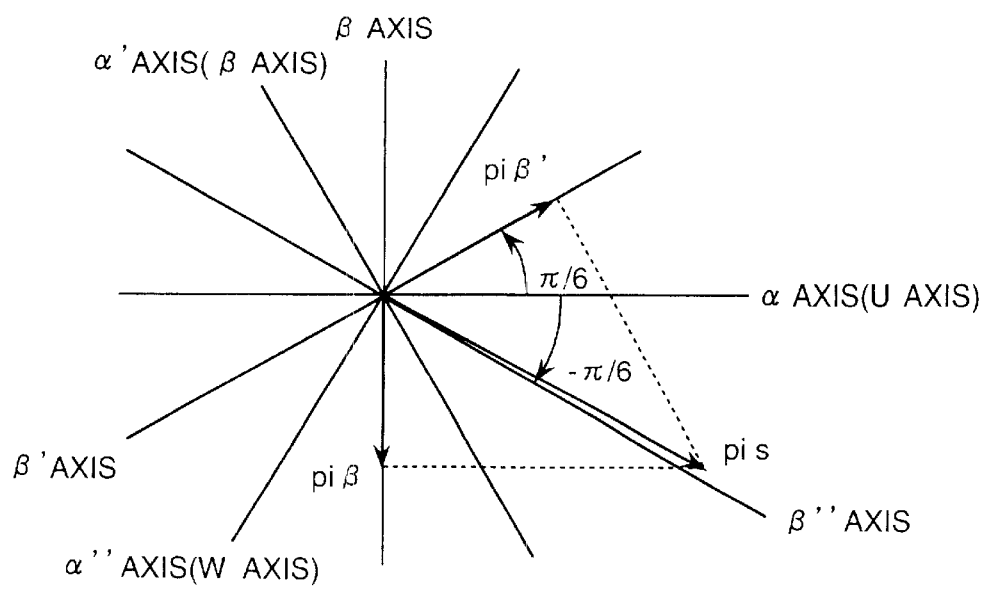
FIG. 3 is a vector diagram showing the principle of a two-phase short-circuit method.

Although the case where the V and W phases have the same potential is explained above, when the W and V phases have the same potential also, there is an direction, in which a current difference does not receive an influence of the applied voltage. Accordingly, it is possible to estimate the current differences in the three-phase short-circuit state, using two current differences in two different directions, obtained in two kinds of two-phase short-circuit states. This principle of obtaining the above current differences is conceptually shown in FIG. 3. FIG. 3 is a vector diagram for explaining the method in which, by using the current difference piβ in the direction where the current difference does not receive an influence of the applied voltage in the V and W-phase short-circuit state, and the current difference piβ' in the direction where the current difference does not receive an influence of the applied voltage in the W and V-phase short-circuit state, the current difference pis in the three-phase short-circuit state is estimated. Since the current difference in the three-phase short-circuit statest is estimated with the current differences in the two directions in the two kinds of two-phase short-circuit states as shown in FIG. 3, it is necessary to determine a combination of two kinds of two-phase short-circuits, and to detect the current difference in a time interval in each kind of two-phase short-circuit.

Figure 4:
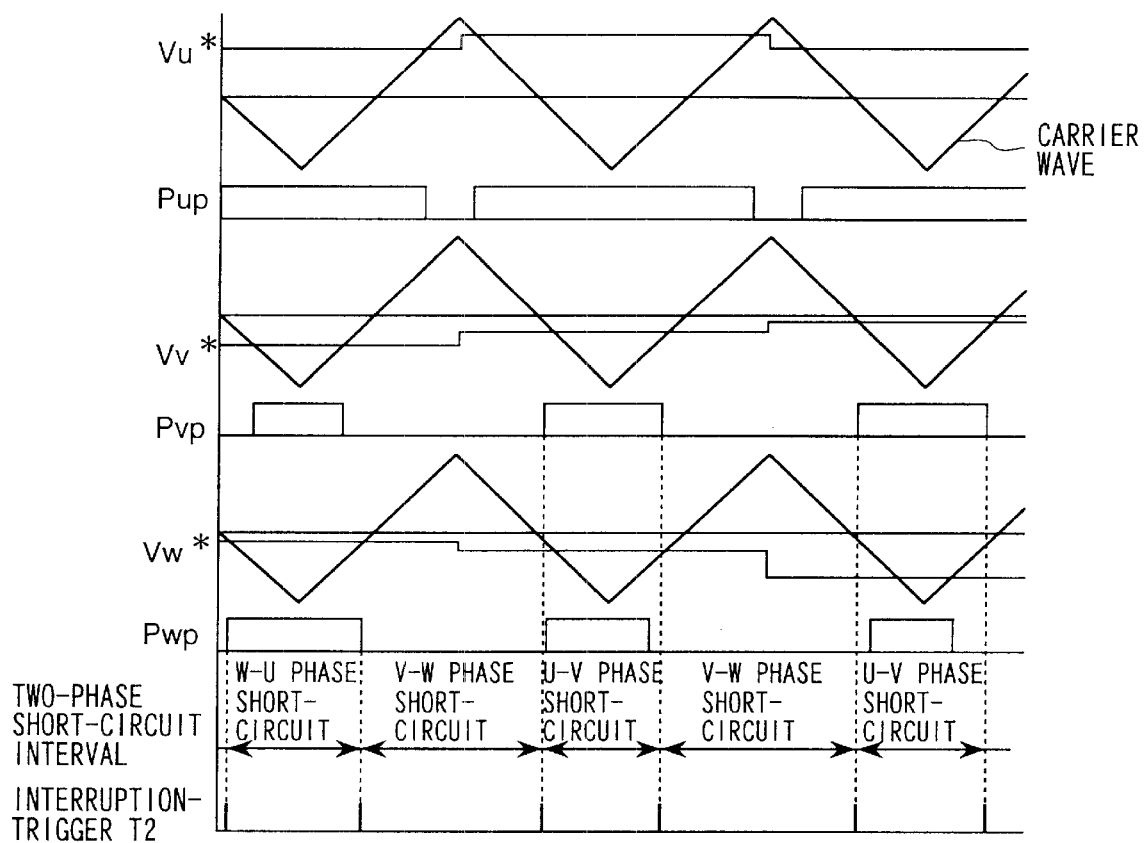
FIG. 4 is a graph showing changes in PWM signals in the case where the determination of a two-phase short-circuit state, and the current-detection in the two-phase short-circuit state, are executed.

The method of determining each two-phase short-circuit state, and the current difference-calculation method, are explained bellow with reference to FIG. 4. FIG. 4 shows changes of PWM signals in the case where each two-phase short-circuit state is determined, and the current difference is detected in this two-phase short-circuit state. Here, FIG. 1 is a simplified graph showing only the PWM signals in the upper arms which are turned to the active state by a Hi-level signal. In this figure, each two-phase short-circuit state is indicated by a pair of thick arrows. As shown in FIG. 4, the phases which turn to a short-circuit state are determined, based on the voltage command indicating an intermediate value in the three-phase voltage commands. Therefore, in order to calculate the current differences in the two-phase short-circuit states, the digital calculation apparatus 4 detects the motor current in synchronization with the rise and the fall of the PWM signal corresponding to the voltage command with an intermediate value, and obtains the amount of current change, that is, the current difference, in the time interval of this two-phase short-circuit state. Specifically, at the timing when the intermediate voltage command value in the voltage command values for the three phases agrees with the value of the PWM carrier wave, the interruption trigger T2 is generated, and the current-detection unit 10 starts the motor current-detection, on receiving the trigger T2. In this way of current detection, the current differences in the three-phase short-circuit state is estimated by using the two current difference values obtained in the successive two time intervals in the two-phase short-circuit state.

Figure 5:
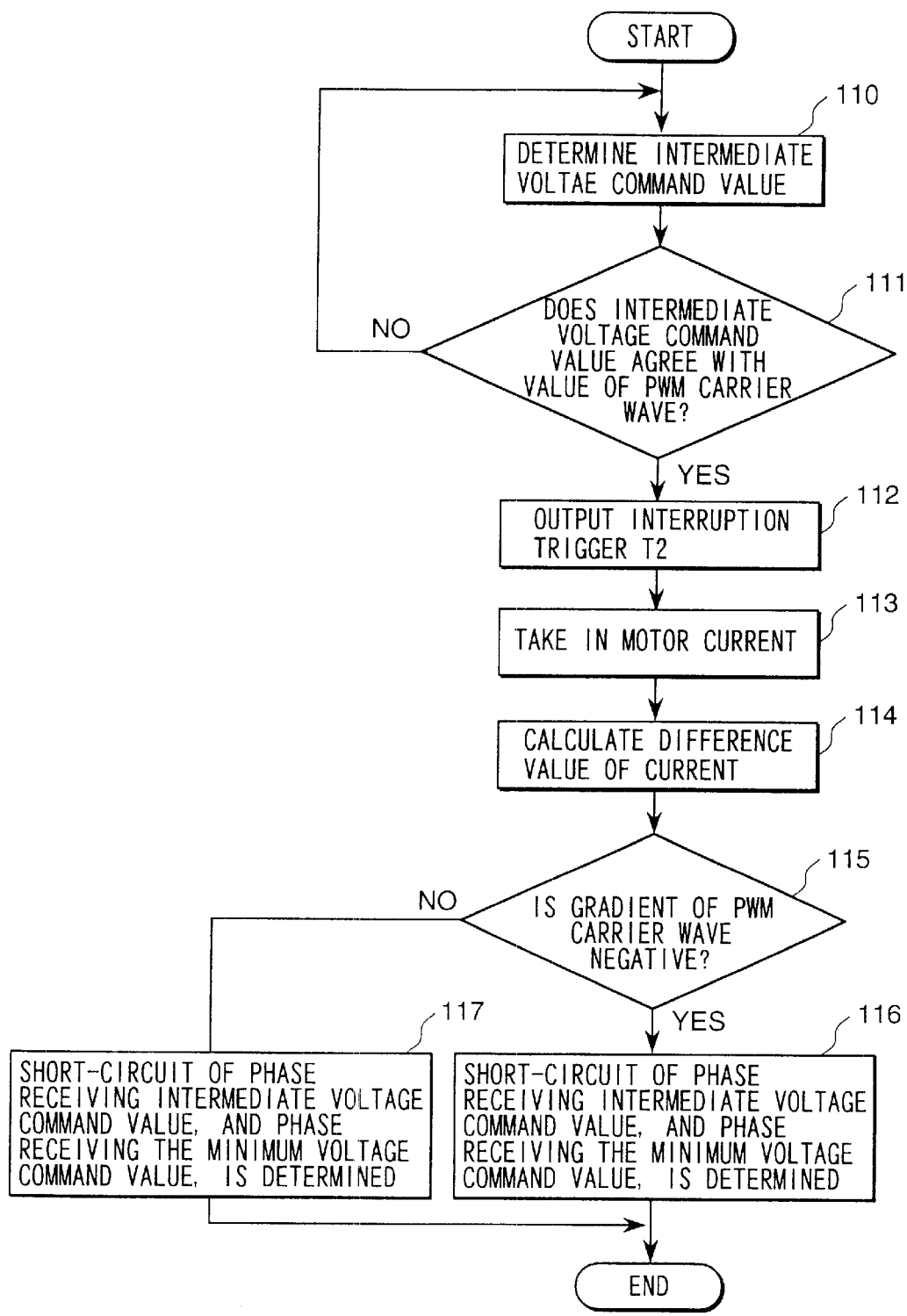
FIG. 5 is a flow chart of the processing of current differences-detection, in which the current difference values in the two-phase short-circuit state are obtained.

The processing executed by the digital calculation apparatus 4 in detecting the current difference in each two-phase short-circuit state, is explained below with reference to the flow chart shown in FIG. 5. First, in step 110, the phase for which voltage command value is an intermediate value, is determined. In step 111, the time point at which the intermediate voltage command value agrees with the value of the PWM carrier wave is detected. That is, this time point corresponds to the rise point or the fall point of the PWM signal for the intermediate voltage command. When the intermediate voltage command value agrees with the value of the PWM carrier wave, the interruption trigger T2 is generated in step 112, and the motor current is taken in to start the detection of the motor current in response to the trigger T2 in step 113. Further, in step 114, the current difference value in the two-phase short-circuit of this time is calculated using two current difference values detected at the previous and present detection time points. Furthermore, in step 115, the gradient of the PWM carrier wave at the time point when the intermediate voltage command value agrees with the value of the PWM carrier wave, is determined. If the gradient is positive, it is determined that two phases corresponding to the intermediate and maximum voltage command values are in the two-phase short-circuit state. Conversely, if the gradient is negative, it is determined that two phases corresponding to the intermediate and minimum voltage command values are in the two-phase short-circuit state. The above-explained processing is the methods of determining each two-phase short-circuit state, and calculating the current difference value in this two-phase short-circuit state.

The timing of calculating each current difference in the direction in which the current difference does not receive an influence of the applied voltage, and the magnetic pole position, using the calculated current differences, is not restricted to a specific time point. However, if the timing of this calculation is delayed, a phase error occurs due to the rotation of the motor, and phase correction for the phase error is necessary. In addition, although a dead time interval is not considered in the flow chart shown in FIG. 5, if there is a dead time interval, it is necessary to generate the interruption signal T2 by taking the dead time interval into account.

In accordance with the above-explained processing, the current difference type magnetic pole position-detection method can be implemented by using the digital calculation apparatus 4.

As explained above, in order to obtain the current differences in the three-phase short-circuit state, the motor current is detected in synchronization with the phase corresponding to the maximum or minimum voltage command value. On the other hand, in order to obtain the current difference values in the two-phase short-circuit state, the motor current is detected in synchronization with the phase corresponding to the intermediate voltage command value. The phase with which the detection of the motor current is synchronized is not fixed to only one phase corresponding to the maximum, intermediate, or minimum voltage command value, and can be switched. The ability to switch such a phase is particularly necessary between the three-phase short-circuit, in which the current differences are directly calculated in the three-phase short-circuit state, and the two-phase short-circuit method.

Figure 6:
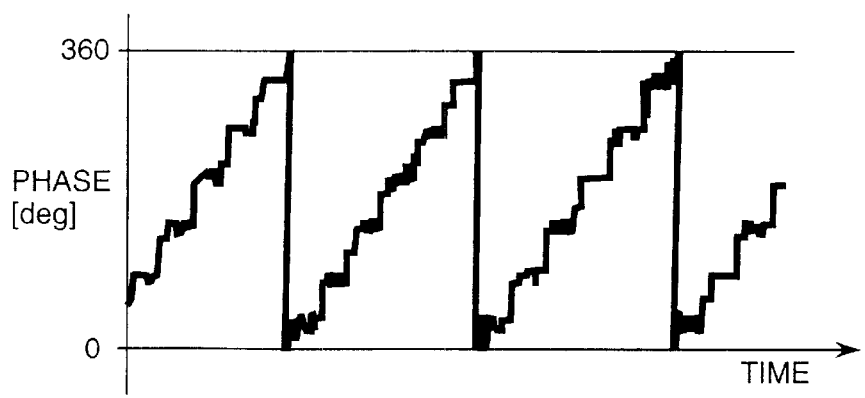
FIG. 6 is a diagram showing an example of the result of the magnetic pole position-calculation.

In the following, the third embodiment of the present invention will be explained. Since the above current difference type magnetic pole position-detection method calculates the current differences, based on the induction voltage induced in the motor, if the induction voltage includes harmonic components, influences of the harmonic components sometimes appear on the calculated magnetic pole position. An example of such influences of the harmonic components on the calculated magnetic pole position is shown in FIG. 6. In FIG. 6, it can be seen that the sixth-order harmonic wave with respect to the fundamental frequency appears.

Figure 7:
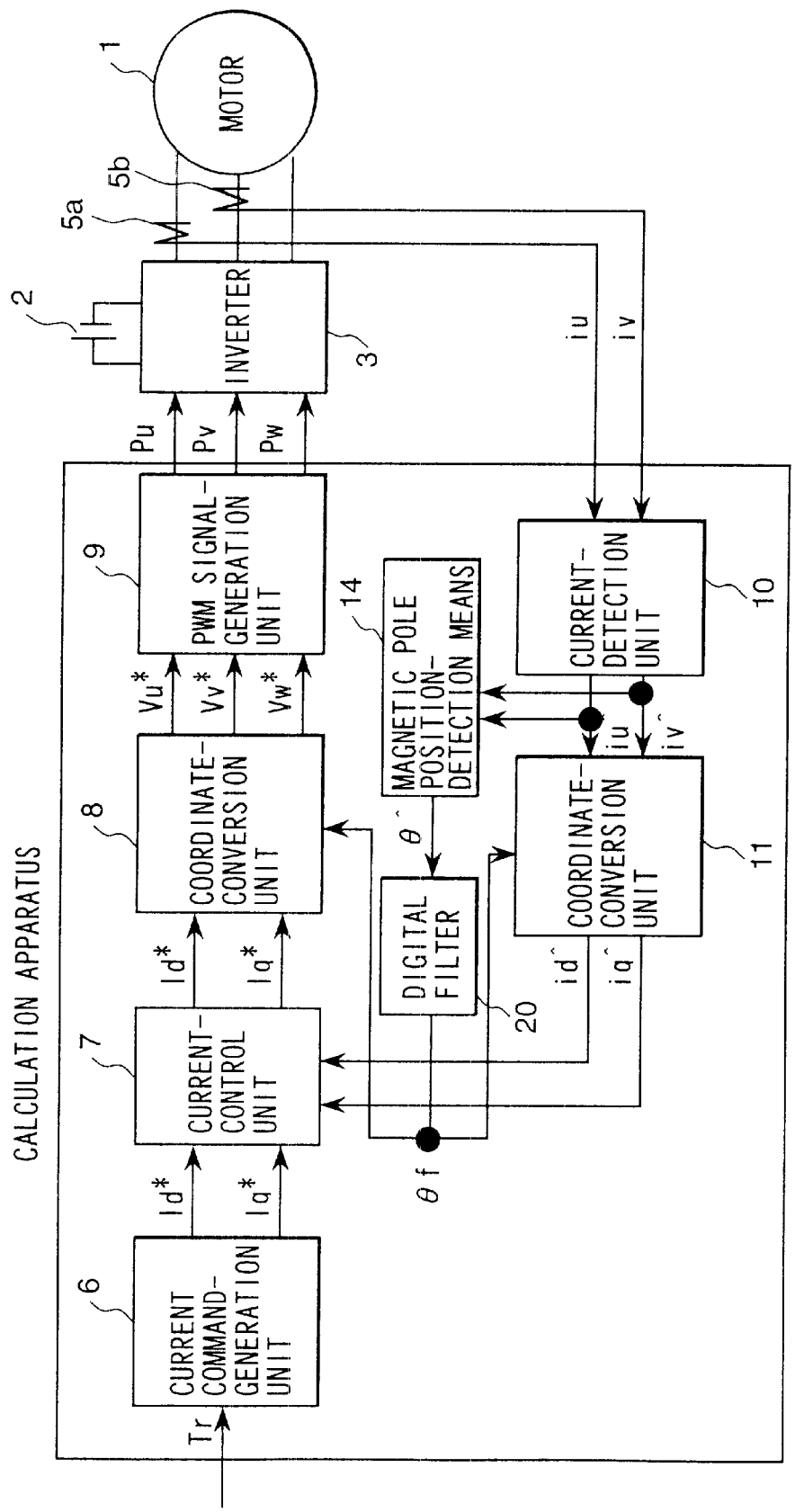
FIG. 7 is a schematic block diagram showing the composition of the position-sensorless motor-control system including a digital filter.

One method of removing such harmonic components is a digital-filter which is composed in the digital calculation apparatus in this embodiment. The composition of a position-sensorless control system is shown in FIG. 7. Although a generally used low-pass filter can be applied to the digital filter 20 shown in FIG. 7, since a frequency of a harmonic wave contained in the calculated magnetic pole position changes depending on the rotational frequency of the motor, it is favorable that a cut-off frequency set up to the digital filter 20 can be changed.

Figure 8:
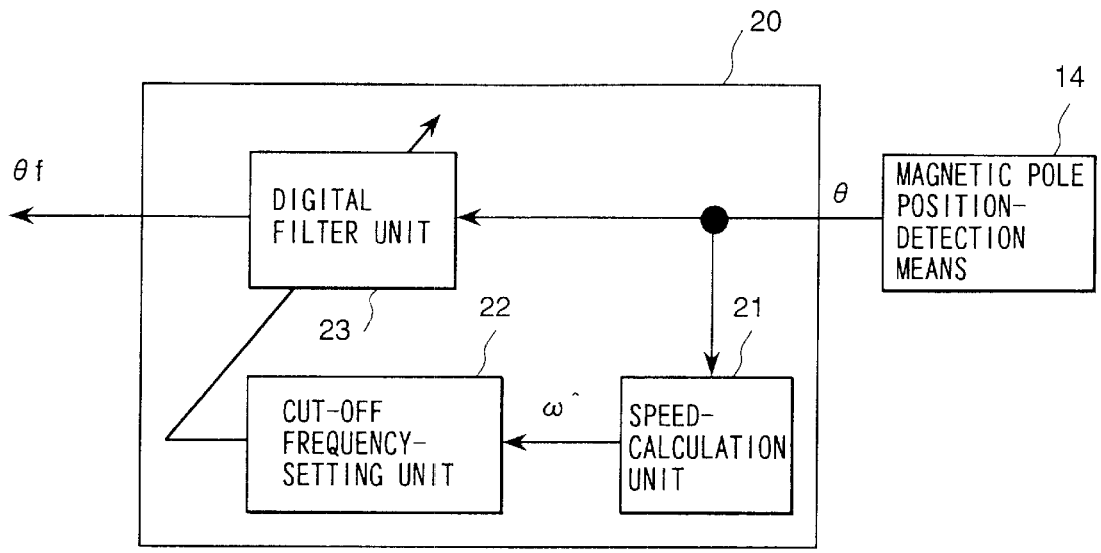
FIG. 8 is a schematic block diagram showing the digital filter shown in FIG. 7.

So, the digital filter 20 is composed, as shown in FIG. 8, so that its cut-off frequency is changed according to the motor speed. First, the detected magnetic pole position $\theta^\wedge$ is input to a speed-calculation unit 21, and the estimated rotational frequency $\omega^\wedge$ of the motor is calculated. The estimated rotational frequency $\omega^\wedge$ can be obtained by calculating the rate of change in the magnetic pole position $\theta^\wedge$. Further, a cut-off frequency unit 22 determines the cut-off frequency of a digital filter 23, based on the estimated rotational frequency $\omega^\wedge$. The cut-off frequency is set as a frequency such that it is lower than the removed harmonic frequency, and a delay of the fundamental component, due to the filtering with the cut-off frequency, can be ignored in the motor-control.

The method of implementing the magnetic pole-detection method, which uses a digital calculation apparatus such as a microcomputer, is described above, and this method is suitable for a control apparatus of an electrical car and an electrical vehicle such as a hybrid car. The reason why this method is suitable for a control apparatus of an electrical car and an electrical vehicle, is that a microcomputer is mainly used in a control apparatus of an electrical cal, and an electrical vehicle; a permanent magnet type synchronous motor has been also mainly used from the view point of downsizing and efficiency-improvement of a motor; and a sensorless control method is desired for an electrical car, and an electrical vehicle in light of the need for high reliability and low cost.

In accordance with the present invention, it has become possible to detect the magnetic pole position of a synchronous motor while performing a usual PWM control, using a cheap digital calculation apparatus such as a microcomputer, without the addition of a signal for detecting the magnetic pole position.

What is claimed is:

1. Apparatus for controlling a synchronous motor, comprising:

a PWM inverter for driving said synchronous motor;

a digital calculation apparatus for controlling said PWM inverter;

magnetic pole position-detection means, contained in said digital calculation apparatus, for obtaining a magnetic pole position based on current which flows in said synchronous motor and is input to said digital calculation apparatus; and control means for controlling said synchronous motor based on the detected magnetic pole position;

wherein said magnetic pole position-detection means takes in the current which flows in said synchronous motor, by operating an A/D converter with an interruption signal generated by said position-detection means in synchronization with PWM signals for driving said PWM inverter.

2. The apparatus according to claim 1, wherein:

said synchronous motor is a three-phase alternating current synchronous motor; and said magnetic pole position-detection means takes in the current flowing in said motor by operating an A/D converter with an interruption signal generated by said position-detection means in synchronization with a PWM signal corresponding to at least one of a maximum value and a minimum value of three-phase alternating current voltage signals sent to said motor.

3. The apparatus according to claim 1, wherein:

said synchronous motor is a three-phase alternating current synchronous motor; and said magnetic pole position-detection means takes in the current flowing in said motor by operating an A/D converter with an interruption signal generated by said position-detection means in synchronization with PWM signal corresponding to an intermediate value of three-phase alternating current voltage signals sent to said motor.

4. The apparatus according to claim 1, wherein:

said synchronous motor is a three-phase alternating current synchronous motor; and said magnetic pole position-detection means switches the PWM signal with which the generation of said trigger signal is synchronized, between at least two out of three phases corresponding to the maximum, intermediate, and minimum voltage command values for said motor.

5. A vehicle comprising a synchronous motor as a driving force device, and a synchronous motor control-apparatus of according to claim 1.

6. A vehicle comprising a synchronous motor as a driving force device, and a synchronous motor control-apparatus of according to claim 2.

7. A vehicle comprising a synchronous motor as a driving force device, and a synchronous motor control-apparatus of according to claim 3.

8. A vehicle comprising a synchronous motor as a driving force device, and a synchronous motor control-apparatus of according to claim 4.

* * * * *